United States Patent [19]

Mackenroth

[11] Patent Number: 4,805,980
[45] Date of Patent: Feb. 21, 1989

[54] UNIVERSAL FIBER OPTIC TERMINATION SYSTEM

[76] Inventor: Einhard Mackenroth, Lo Salem Rd., So. Salem, N.Y. 10590

[21] Appl. No.: 806,419

[22] Filed: Dec. 9, 1985

[51] Int. Cl.⁴ .............................................. G02B 6/38
[52] U.S. Cl. ................................ 350/96.21; 350/96.20
[58] Field of Search ................ 350/96.20, 96.21, 96.22

[56] References Cited

U.S. PATENT DOCUMENTS

| | | | |
|---|---|---|---|
| 3,880,452 | 4/1975 | Fields | 350/96.21 X |
| 4,327,964 | 5/1982 | Haesly et al. | 350/96.20 |
| 4,526,438 | 7/1985 | Essert | 350/96.20 |
| 4,553,814 | 11/1985 | Bahl et al. | 350/96.21 |
| 4,611,886 | 9/1986 | Cline et al. | 350/96.20 |
| 4,614,402 | 9/1986 | Caron et al. | 350/96.21 |
| 4,615,581 | 10/1986 | Morimoto | 350/96.21 |
| 4,708,431 | 11/1987 | Pikulski et al. | 350/96.20 |
| 4,714,318 | 12/1987 | Hayashi et al. | 350/96.21 |

*Primary Examiner*—John D. Lee
*Attorney, Agent, or Firm*—Alfred E. Miller

[57] ABSTRACT

A coupling for a fiber optic cable includes a sleeve of non-light transmissive material having external threads on each end and an axially central radial projection. The core extending through the sleeve has opposed frusto-conical surfaces. An adapter is threaded on the core and shaped to conform to the termination element of the cable to which the coupling is to be connected.

15 Claims, 2 Drawing Sheets

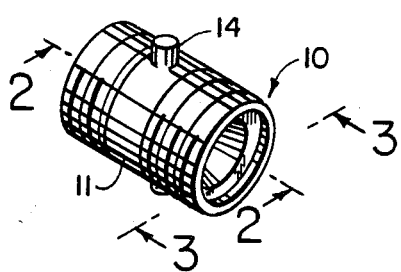
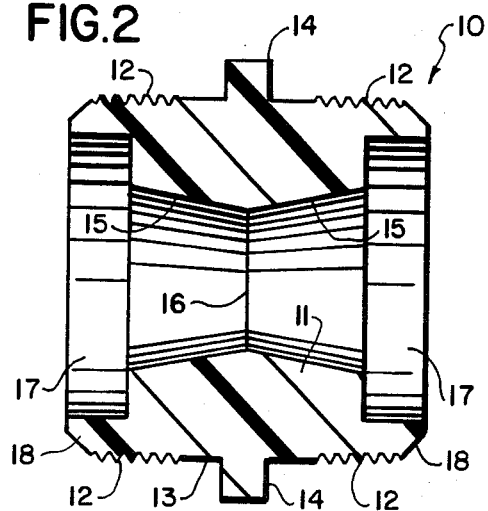
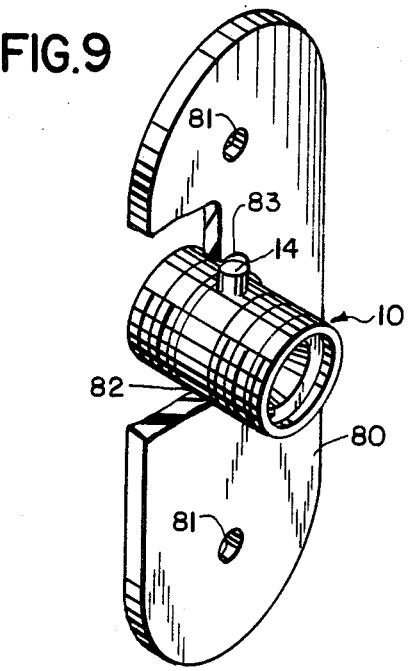
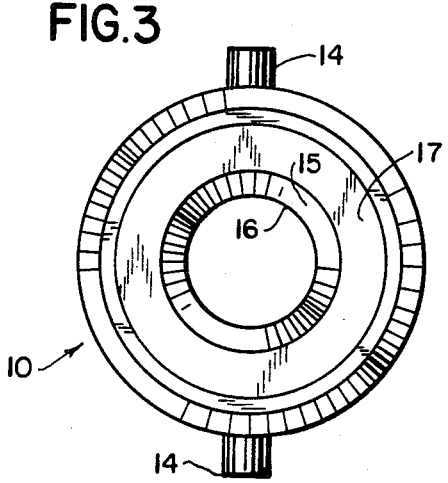
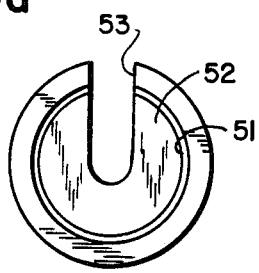
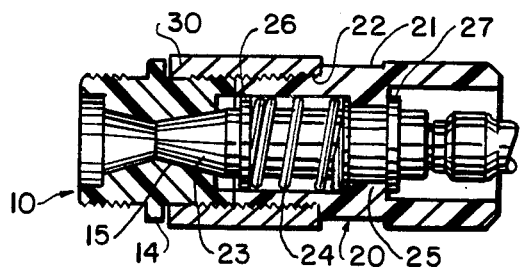

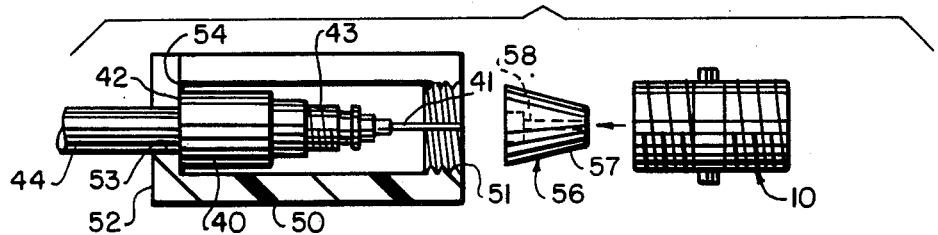
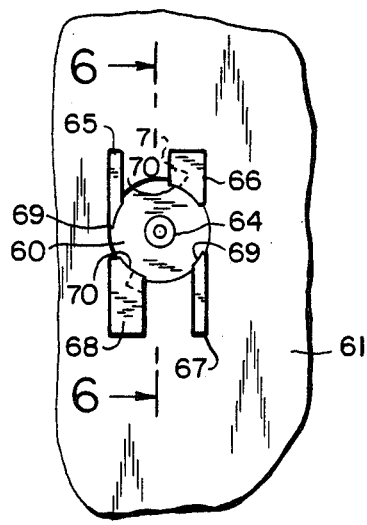
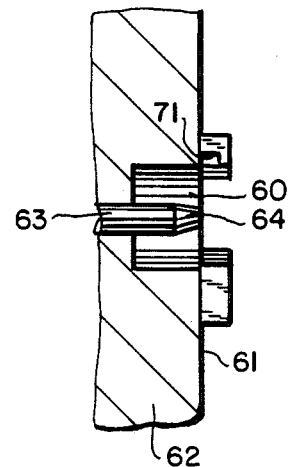
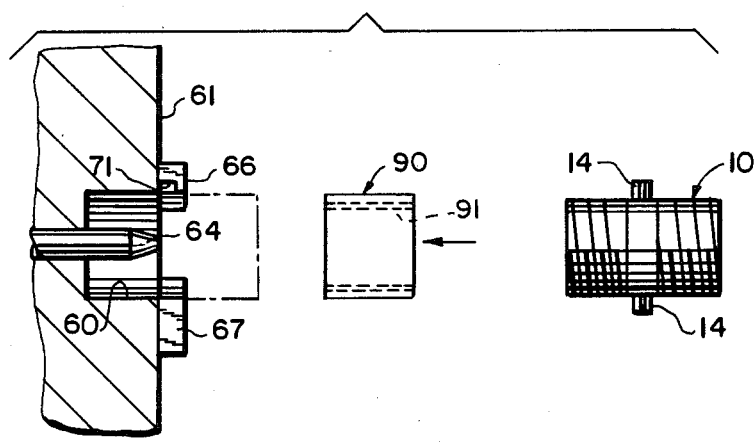

UNIVERSAL FIBER OPTIC TERMINATION SYSTEM

This invention relates to a termination system for fiber optic cables, and is more particularly directed to a fiber optic termination system enabling interconnection of fiber optic cables and devices having any of a number of different terminations, in a simple, economical and expedient manner.

In the past, it has been common for different manufacturers of fiber optic cable terminations to design their respective cable terminations in accordance with their own specifications, thereby rendering direct interconnection of cables or cable systems from different manufacturers impossible.

Such different cable termination standards have required the design of special connections for each type of cable or device interconnection. This practice necessitated increases in the cost of interconnecting various types of fiber optic cables, or delay in the design of systems, by requiring stocking or ordering of a number of different types of connecting assemblies.

The present invention is therefore directed to the provision of a universal fiber optic termination system enabling the interconnection of many different types of fiber optic terminations with a minimum number of economically produced components.

Briefly stated, in accordance with the invention, the universal fiber optic termination system is comprised of a central core element adapted to receive any of a number of different adapters, for affixing the core member to the various types of fiber optic terminations. The core member is comprised of a sleeve of a suitable material, such as ABS, with external threads on each end thereof. A tapered recess extends axially inwardly from each end of the sleeve, the recesses having reduced diameter as they proceed axially inwardly, and joining one another at the center of the sleeve to define a central aperture extending therethrough. An angular recess may join the axial outer ends of the tapered recesses to the respective ends of the sleeve. In addition, at least one, and preferably two diametrically opposed projections are provided on the external side of the sleeve and centrally thereof, the projections having circular cross sections.

In order to interconnect the core with one type of cable termination having a rotatable externally threaded connector, in accordance with the invention, a nut is provided having internal threads and threaded over a respective end of the core. The nut, in this instance, is sufficiently long to receive the rotatable externally threaded end of the cable connector, to be threaded therein, with the tapered fiber optic cable abutting the tapered recess at the respective end of the core.

In a further adapting arrangement of the invention, wherein the cable is not tapered at its end, and the termination is rotatably affixed to the cable at a distance from its end, and having external threads adapted to be received in a special connector, in accordance with the invention the adapting arrangement is comprised of a bracket with internal threads at one end to receive the external threads of one end of the core, the other end of the bracket being shaped to fit behind the cable terminantion, to hold it in place and urge the termination towards the core upon fitting of the adapter over the core end. In addition, an internal adapter is provided having a frusto-conical outer surface abutting the frusto-conical interior surface of the core, this adapter part having a central hole of uniform diameter to receive the fiber optic cable itself.

In a further type of cable termination, employed for example wherein the cable terminates in a panel, the fiber optic cable has a frusto-central end extending from the rear of the panel into the bottom of a cylindrical recess at the face of the panel, the cable having a diameter less than that of the recess. A plurality of catch projections are provided on the face of the panel adjacent to the recess. In accordance with the invention, an adapting arrangement for the core is comprised of an internally threaded sleeve threaded onto one end of the core, the sleeve having a diameter to fit snugly in the recess of the panel. In this instance, the frusto-conical end of the cable abuts the internal frustoconical surface of the core. The external projections of the core are shaped to engage notches in the projections of the panel, so that upon rotation of the core the projections fit into such notches to firmly hold the core to the panel, thereby permitting a cable to be affixed to the other end of the core.

In a still further embodiment of the invention, wherein cables are fit to both ends of the core, the core may be fit into a hole in a plate adapted to be fixedly mounted. The plate has a notch for receiving the projection of the core, so that the core cannot be rotated during the assembly and disassembly of cable interminations thereon.

In order that the invention may be more clearly understood, it will now be disclosed in greater detail with reference to the accompanying drawings, wherein:

FIG. 1 is a perspective view of the core of a universal fiber optic connector arrangement in accordance with the invention;

FIG. 2 is an enlarged cross sectional view of the core of FIG. 1;

FIG. 3 is an end view of the core of FIG. 2;

FIG. 4 is a partially cross sectional view illustrating the core interconnected with one type of cable termination, employing one form of adapted in accordance with the invention;

FIG. 5 is an exploded view illustrating the interconnection of the core with another type of cable termination, employing a second form of adapter in accordance with the invention;

FIG. 5a is an end view of the open end and the adapter sleeve employed in FIG. 5;

FIG. 6 is a partially cross sectional view of a known panel cable termination arrangement;

FIG. 7 is a face view of the arrangement in FIG. 6;

FIG. 8 is an exploded view of the interconnection between the panel termination of FIGS. 6 and 7 and the core of the invention, employing a further form of adapter; and FIG. 9 is a perspective partially cut away view of the core amounted in a plate in accordance with a further embodiment of the invention.

Referring now to the drawings, and more in particular to FIGS. 1-3, therein is illustrated the core 10 of the universal fiber optic connection system in accordance with the invention. The core 10 is comprised of a sleeve 11 of a nonlight transmissive material. The sleeve 11 may have a diameter, for example only, of 0.925 inches and a length of 0.570 inches. The two external ends of the nut are provided with threads 12, leaving the central portion 13 of the sleeve without threads. For example, the central portion 13 may have an axial length of 0.6 inches, and the threads may be 7/16–14 double threads.

At least one circular cross section projection 14 is provided extending radially from the center 13 of the sleeve, preferably two such projections 14 on diametrically opposite sides being provided as will be discussed.

The central interior portion of the sleeve 10 has a pair of frusto-conical surfaces 15 with their smaller diameter ends abutting at the axial center 16 of hte sleeve. The frusto-conical surfaces 15 extend axially outwardly to terminate in circular recesses 17 at the ends of the sleeve. The recesses 17 may have diameters of 0.35 inches and depths of 0.08 inches, the frusto-conical surfaces 15 having minimum diameters of 0.169 inches and taper angles of 19.5 degrees.

It is of course apparent that the above dimensions are purely exemplary, and other dimensions may be employed for the core element of the invention.

The ends of the core may also have a chamfer 18, for example, a 45 degree 1/32nd inch chamfer.

FIG. 4 illustrates the connection of one embodiment of the fiber optic connection system in accordance with the invention to one known type of cable termination arrangement. Thus, a termination arrangement is in the form of plug assembly 20, for example type DSP-3A of Dorran Photonics Incorporated of Atlantic Highlands, N.J. The plug assembly 20 is comprised of a rotatable external sleeve 21 having external threads 22 at one end. The cable end 23 is tapered. A helical spring 24 extends between an internal flange 25 of the sleeve 21 and a washer 26 fixed to the cable, so that the sleeve 21 is biased resiliently away from the end 23 of the cable against a stop 27 on the cable.

In accordance with this embodiment of the invention, an adapter for adapting the core 10 to the plug assembly 20 is comprised of an internally threaded nut 30. The nut 30 is threaded on one end of the core 10, and extends beyond the end of the core 10 an adequate distance to receive the threads 22 of the sleeve 21. Thus, in assembly, the nut 30 may be initially threaded on the core 10. The plug assembly cable end 23 is then fit into the core 10, and the sleeve 21 rotated to thread the sleeve into the nut 30. The resilient bias of the plug assembly enables the cable end 23 to snugly abut the frusto-conical surface 15 of the core, while permitting the sleeve 21 to be fully threaded into the nut.

In this adapting arrangement of the invention, it is thereby apparent that, in addition to the core 10, the interconnection may be effected merely with the use of an additional nut 30 of very simple design.

In a further known cable termination, as illustrated in FIG. 5, manufactured by Nippon Electric Company, a rotatable metal sleeve 40 is provided adjacent the end of fiber optic cable, the projecting cable 41 having a uniform diameter. The sleeve 40 has an enlarged end 42 away from the cable end, and external threads 43 centrally located to engage a connector assembly (not shown) especially adapted for this type of fiber optic cable termination.

In accordance with the invention, as illustrated in FIG. 5, an adapter means for adapting the cable termination to the core 10 is comprised of a partially closed end nut 50. The nut 50 is open at one end, having internal threads 51 for receiving the threaded end of the core 10. The other end 52 of the nut is closed, and a slot 53 extends axially through the nut for its extent, as illustrated in FIG. 5a, for receiving the cable termination laterally, enlarged end 42 thereof centrally abutting the inner back wall 54 of the nut 50. Thus, the nut 50 may be assembled on the cable termination merely by moving it laterally to enclose the cable termination, with the fiber optic cable 44 extending through the rear wall 52 at the slot 53. The nut 50 is rotatable on the cable termination so that it may be threaded onto one end of the core 10.

In addition, the adapter means comprises a ferrule 56 of non-light transmissive material and having a tapered outer surface 57 adapted to be snugly received in the frusto-conical inner portion 15 of the core 10. The ferrule 56 further has a central axial hole 58 shaped to snugly receive the fiber optic cable end 41, the hole 58 thus having a uniform diameter. In the assembly of the core 10 onto the cable termination, then, the ferrule 56 is initially inserted either within the core 10, or on the cable end 41.

FIGS. 6 and 7 illustrate a panel-type cable termination manufactured by Wescon, wherein a cylindrical recess 60 is provided extending into the front 61 of a panel 62. A fiber optic cable 63 extends into the panel from the rear thereof, having a tapered end 64 extending to the plane of the front 61 of the panel. The recess 60 has a diameter substantially larger than that of the cable 63. The means for holding the cable in the panel does not form a part of the present invention, and is hence not illustrated therein.

A plurality of projections 65, 66, 67 and 68 is provided extending from the front 61 of the panel, adjacent the recess 60. The projections 65 and 67 are generally diametrically opposite, and have arcuate guide surfaces 69 aligned with the sides of the recess 60, for guiding a cable connector. The projections 66 and 68 are also diametrically opposite one another, and spaced between the projections 65 and 67, these projections having a somewhat longer arcuate surface 70 aligned with the recess 60. Notches 71 extend partially laterally through the projections 66 and 68 adjacent the front 61 of the panel, for receiving suitable retaining projections of a connector (not shown) especially fabricated to be connected to this cable termination.

In accordance with the invention, as illustrated in FIG. 8, the core 10 is adapted to be connected to the cable termination of the type illustrated in FIGS. 6 and 7, by the provision of an internally threaded sleeve 90 having an outer diameter to be snugly received in the recess 60 of the cable termination. The internal threads 91 are threaded on the end of the core 10, the sleeve 90 having a length substantially equal to that of the threaded end of the core.

In assembly, the sleeve 90 is initially threded onto the end of the core 10, this combination then being assembled to the cable termination by inserting the sleeve 90 axially into the recess 60, until the projections 14 abut the front 61 of the panel. This insertion is effected with the projections 14 intermediate the projections 65-68 of the panel, i.e., with one of the projections 14 extending between the projections 65 and 66 and the other projection 14 extending between the projections 67 and 68. The core 10 is then rotated clockwise, until the projections 14 of core 10 fully enter the notches 71 of the projections 66 and 68, to firmly hold the core to the panel. In this position the tapered end 64 of the cable snugly engages the interior frusto-conical surface 15 of the core 10.

In a still further embodiment of the invention, as illustrated in FIG. 9, a plate 80 may be provided for holding the core 10 to any suitable frame or the like, for example by means of screws or the like (not shown) extending through mounted holes 81 of the plate. The plate 80 has a hole 82 extending therethrough of a diameter to receive the core 10. One side of the hole 82 is notched, as illustrated at reference numeral 83, to receive the projection 14 of the core. A similar notch (not shown) is provided on the other side of the hole 82. In this embodiment of the invention, with the plate 80 suitably mounted to any device, the core may be inserted in the hole 82, and the threaded ends thereof connected with the proper adapters, such as discussed above, to the known cable terminations.

While the core 10, as discussed above, may be formed of a substantially rigid, i.e. non-resilient material, in accordance with a further embodiment of the invention, the material of the core 10 may have a determined degree of flexibility, to provide an adjustable attenuator. In this embodiment of the invention the core 10 is physically shaped as above discussed, preferably enabling the tapered cable ends of fiber optic cables to snugly abut one another when received in opposite frusto-conical ends of the core. When a low degree of tightening is applied to the nuts or other adapters of the core, as above discussed, the fiber optic cable ends remain abutting one another, or substantially abutting one another, within the core 10. Upon tightening of the nuts or other adapters, as above discussed, the adapters abut the projections 14, and, with further tightening, tend to stretch the central portion of the adapter. This stretching, which is adjustable independent upon the degree of tightening of the nuts or adapters, forces the cable ends within the core 10 apart to a determinable degree, thereby to introduce a controllable attenuation within the core 10.

While the invention has been disclosed and described with reference to a limited number of embodiments, it is apparent that variations and modifications may be made therein, and it is therefore intended in the following claims to cover each such variation and modification as follows within the true spirit and scope of the invention.

What is claimed is:

1. In a coupling for a fiber optic cable wherein the cable has a termination element affixed to one end thereof, the improvement wherein said coupling comprises a core and an adapter means, said core comprising a sleeve of non-light transmissive material, the sleeve having external threads at each end and having an axially central radially extending projection, the interior of the sleeve defining a hole extending therethrough with opposed frusto-conical surfaces, the minimum diameter ends of said frusto-conical surfaces abutting axially centrally of said core, said adapter means being threaded on said threaded core and shaped to conform to said termination element, said frusto-conical surfaces of said hole extending substantially to the respective ends of said core.

2. The coupling of claim 1 wherein said core has a second projection diametrically opposite said first mentioned radially extending projection.

3. The coupling of claim 2 wherein said first mentioned and second projections has circular cross sections.

4. The coupling of claim 1 wherein said adapter means comprises a nut fitted on one end of said core, with an internally threaded end thereof extending beyond said core to receive said termination element.

5. The coupling of claim 1 wherein said adapter means comprises a sleeve having a smooth exterior and a threaded interior threaded onto a threaded end of said core.

6. The coupling of claim 1 wherein said adapter means comprises a closed end sleeve having an open end internally threaded and threaded on said core, said closed end sleeve being longitudinally split to receive and hold said termination element.

7. The coupling of claim 6 wherein said adapter means further comprises a ferrule of non-light transmissive material with a tapered outer surface abutting one of said frusto-conical surfaces of said core, said ferrule having a central hole for snugly receiving a cable end of said termination element.

8. The coupling of claim 1 wherein said core is of a flexible material.

9. The coupling of claim 1 wherein said projection has a circular cross section.

10. The coupling of claim 1 wherein said frusto-conical surfaces terminate in circular recesses at each end of said sleeve.

11. The coupling of claim 1 wherein said frusto-conical surfaces have taper angles of substantially 19.5 degrees.

12. The coupling of claim 1 further comprising a plate having a hole extending therethrough and receiving said sleeve centrally of the threaded ends of said sleeve, said plate having a notch at the periphery of said hole and extending only partially through the thickness of said plate, said notch receiving said projection.

13. The coupling of claim 1 wherein at least a portion of the threads at each end of said core are radially aligned with the frusto-conical surfaces at the respective end of said core.

14. The coupling of claim 1 wherein said hole has circular recesses at each end thereof, said conical surfaces abutting said circular recesses, the diameters of said recesses being greater than the maximum diameters of the respective conical surfaces.

15. The coupling of claim 1 for coupling to a fiber optic cable having a frusto-conical end, wherein said adapter means comprises means for holding the frusto-conical end of a cable to abut a frusto-conical surface of said hole of said core.

* * * * *